United States Patent [19]

De Longe et al.

[11] 4,202,768
[45] May 13, 1980

[54] BACKWASH WATER RECYCLING SYSTEM

[75] Inventors: Harry C. De Longe, Katonah; Woolfe S. Fabian, Flushing, both of N.Y.

[73] Assignee: PepsiCo, Inc., Purchase, N.Y.

[21] Appl. No.: 943,806

[22] Filed: Sep. 19, 1978

[51] Int. Cl.² .............................................. B01D 23/24
[52] U.S. Cl. ........................................ 210/62; 210/82; 210/205; 210/411
[58] Field of Search ................... 210/62, 70, 82, 205, 210/231, 275, 333 R, 335, 411, 412, 193

[56] References Cited

U.S. PATENT DOCUMENTS

| | | | |
|---|---|---|---|
| 2,322,428 | 6/1943 | Eickemeyer | 210/193 X |
| 2,596,392 | 5/1952 | Fessler | 210/193 X |
| 3,679,052 | 7/1972 | Asper | 210/411 X |
| 3,994,803 | 11/1976 | Neff et al. | 210/82 X |
| 4,028,241 | 6/1977 | Davis et al. | 210/82 X |

Primary Examiner—William A. Cuchlinski, Jr
Attorney, Agent, or Firm—Scully, Scott, Murphy & Presser

[57] ABSTRACT

A process and apparatus for the treatment of the aqueous backwash effluent resulting from a backwashing operation of an industrial filter. During the backwashing operation, particulate matter and solids are dislodged from the industrial filter so as to be entrained in the backwash effluent, and the effluent is passed through a backwash filter to remove these materials. After passing through the backwash filter, the normally water-based backwash solution is directed to a holding tank for storage until a subsequent backwashing operation is required. The pH value and chlorination level of the backwash solution are periodically adjusted to maintain them within selected ranges in order to optimize the sanitizing effect of the solution during the backwashing operation. The process and apparatus results in the consumption of a much smaller quantity of water than prior arrangements wherein a singleuse backwash solution is dumped into the general effluent discharge of the plant.

15 Claims, 1 Drawing Figure

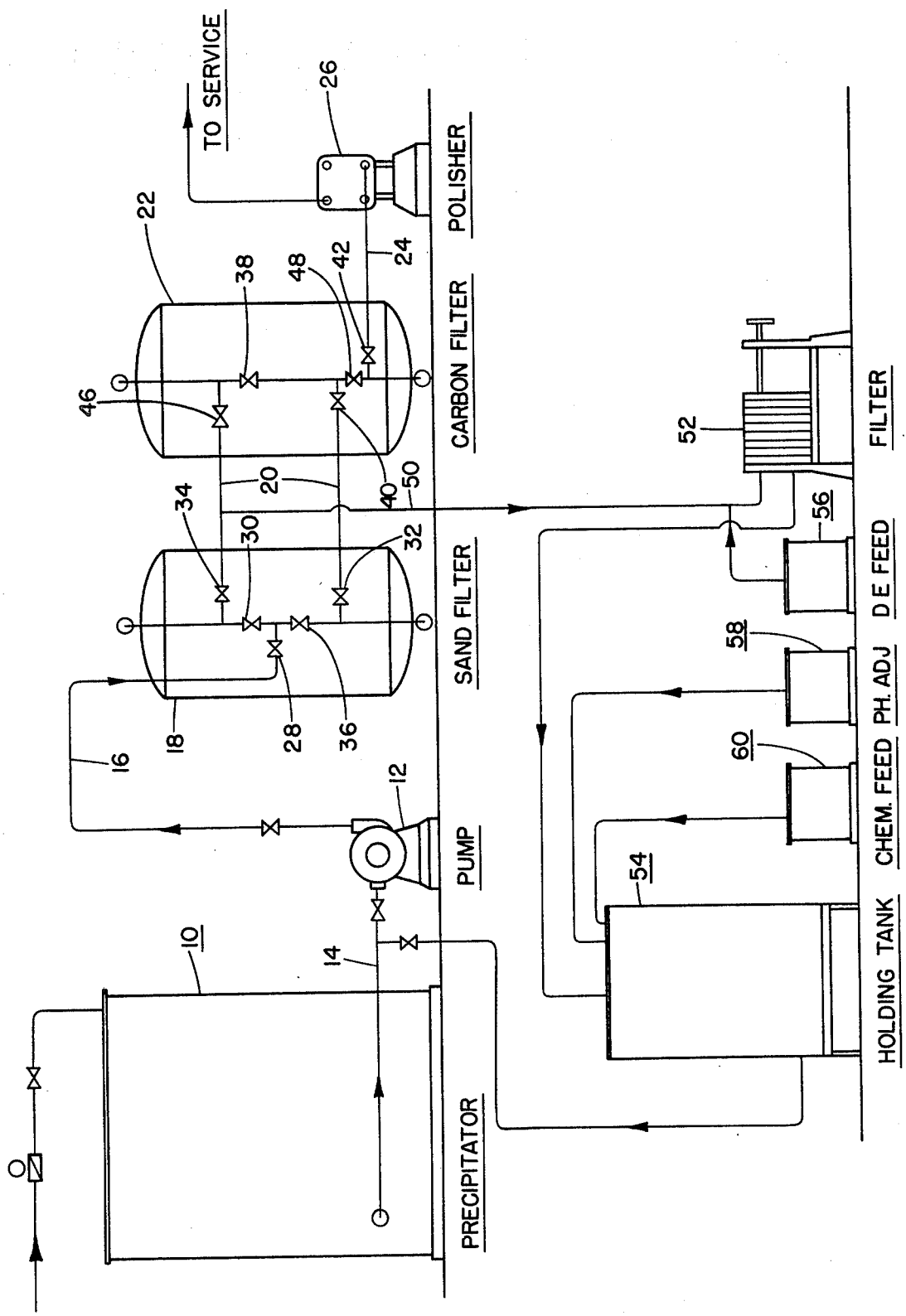

BACKWASH WATER RECYCLING SYSTEM

BACKGROUND OF THE INVENTION

1. Field of the Invention

The present invention generally relates to a process and to an apparatus for the treatment of backwash effluent resulting from a backwashing operation carried out on an industrial filter. More specifically, the invention relates to a process and to an apparatus which utilizes a backwash filter to cleanse the backwash effluent from solids and other impurities released from the industrial filter during the backwashing operation, and wherein the resultant treated and purified backwash liquid is recycled for use in subsequent and repeated backwashing operations.

2. Discussion of the Prior Art

In many beverage and bottling plants currently in operation, industrial filters of the sand and carbon types are employed in the industrial processes which are effected therein. These sand and carbon filters are periodically or cyclically cleaned by means of a backwashing operation at which time a water-based solution or liquid is conducted through the respective filter in a counter-current flow direction with regard to the flow through the filter during a normal filtering operation. The backwashing procedure is adapted to remove any solids and particulate material from the industrial filter in order to maintain the latter in an efficient operating condition. Typically, a backwashing operation necessitates the employment of a large volume of water and, during this operation, varied amounts of heavy solids are dislodged and, as a consequence, released from the industrial filter for removal therefrom.

In a typical backwashing operation of this nature, the effluent from the backwashing operation is dumped into the general effluent discharge of the plant, thereby producing a number of detrimental effects. Thus, for example, the backwash liquid frequently is rather expensive, since it may be constituted of a water-based solution which is treated with costly chemical additives in order to maintain its pH and chlorination values within predetermined parameters for imparting maximum sanitizing properties thereto during backwashing operations. Accordingly, dumping the backwash effluent into the general effluent discharge of the plant and its concomitant single use results in the discharging of a rather costly treated backwash liquid, frequently rendering the operation uneconomically expensive. Furthermore, the discharge of the backwash effluent into the waste treatment system of the plant often causes the imposition of a very large and, occasionally, sudden demand on that system. The waste treatment system is heavily or shock loaded as a result of the large quantity of backwash liquid involved in the operation and, in addition, because the solution is chlorinated, and carries along appreciable quantities of solids and particulate material which is backwashed from the industrial filter.

Heretofore, various kinds of systems have become known in the prior art whose function is the reclamation and reuse of the backwash water, however, these prior art systems do not attempt to either control or remove the heavy solids released from the industrial filter during the backwashing operation. In addition, the prior art systems are not concerned with the optimization of the backwashing operation by maintaining the chlorination and acidity or pH values of the backwash liquid at levels which would result in the most efficient performance in the backwashing function. The present invention, thusly, would have excellent use in conjunction with DeLonge U.S. Pat. application No. 832,283, assigned to a common assignee, and which is directed to a process and apparatus for the treatment of aqueous waste materials and effluent from bottling plants and installations. The DeLonge process and system is particularly concerned with the removal of biological oxygen demand (BOD) from the waste materials, and is also directed toward the treatment of the many different types of effluent discharges of a beverage or bottling plant, but is not specifically directed towards the problems associated with the reclamation or recycling of backwash effluent resulting from the backwashing operation of an industrial filter. Utilizing the invention process and apparatus in the treatment and recycling of the backwash liquid in combination with the process and system in the copending DeLonge patent application would provide an efficient and economically viable installation for the treatment of industrial effluents not in any manner taught nor contemplated in the prior art.

Chapman et al U.S. Pat. No. 3,592,743 discloses a system for the treatment of industrial and domestic waste water having a relatively high solids content, wherein the waste water is recycled in order to reduce the usage of water. More particularly, the Chapman et al system is designed for use in areas in which the available water supply is rather restricted and, moreover, wherein waste disposal systems are already present and in use. The processes and systems disclosed by Chapman et al are basically quite different in overall purpose and structure from those of the present invention in that the former is not directed to the recycling of treated backwash water analogous to that contemplated herein.

Kirk U.S. Pat. No. 3,892,659 discloses a waste water purification system in which waste water and activated sludge are admixed in a receiving well, from which the admixture is then later withdrawn. Thereafter, oxygen is introduced into the admixture and the latter is conducted through a series of contained reaction stages. The admixture or solution is then divided into two unequal flows, of which the main flow is recycled directly to the receiving well, and with the second flow of lesser volume being directed to a clarifier from which activated sludge is recycled to the receiving well. The arrangement and process disclosed in Kirk is employed in the recycling of purified water, but the specific arrangement and process is quite distinct from that of the present invention and is not designed for the treatment and reclamation of backwashing liquid.

Besik U.S. Pat. No. 4,008,159 discloses a waste water treatment system for the recycling of waste water which incorporates a four-stage operation for effecting the successive removal of various contaminants present in the water. This patent is also quite different in its overall objectives and arrangement from the inventive process and system disclosed in the present patent application in that it does not relate to the treatment and recycling of backwashing liquid.

SUMMARY OF THE INVENTION

Accordingly, the present invention contemplates the provision of a novel and unique process and apparatus for the treatment of the aqueous backwash effluent resulting from a backwashing operation of an industrial filter.

Pursuant to a preferred embodiment of the present invention, there is disclosed a process and apparatus for the treatment of backwash effluent resulting from a backwashing operation in which an industrial filter is cleaned by passing a water-based solution through the filter in a countercurrent flow relative to the flow direction through the filter during a normal filtering operation, and in which the backwash effluent emanating from the backwashing operation is conducted through a backwash filter in order to remove solid materials flushed from the industrial filter during the backwashing operation. Filtering of the backwash effluent in this manner allows the backwash liquid or solution to be reclaimed and reused in subsequent backwashing operations.

In accordance with a preferred embodiment of the invention, the backwash filter comprises a diatomaceous earth filter which is supplied with diatomaceous earth material in conformance with the extent of the flow of backwash effluent through the filter, and wherein the filter is periodically cleaned so as to remove any solid materials accumulated therein. The pH value and the level of chlorination of the backwash solution are maintained within optimum ranges in order to promote the efficient cleaning of the industrial filter by means of the backwash liquid.

In the disclosed inventive embodiment, the industrial filter is one which is employed in an industrial water treatment process effectuated in a bottling plant for the production of bottled carbonated beverage. In a plant of this type, there are commonly used both sand and carbon filters for filtering water-based fluids which flow therethrough and, consequently, the present invention provides for sequential backwashing of a plurality of filters of this nature through the intermediary of the same recycled treated solution. During the recycling operation, the backwash effluent is passed through a backwash filter, and the thus filtered backwash liquid or solution is then directed to a storage or holding tank and held therein until need therefor in a subsequent backwashing operation. Although the present invention is described in connection with its application to a carbonated beverage bottling plant, it should be readily understood by one skilled in the art that the teachings of the invention may be employed in the treatment of backwash effluent from industrial filters in many diverse types of situations and under widely differing operating conditions and demands in various fields of industry.

Accordingly, it is a primary object of the present invention to provide a novel process and apparatus of the abovementioned type for the treatment of the aqueous backwash effluent resulting from a backwashing operation in order to permit the effluent to be recycled for reuse in subsequent backwashing operations.

Another object of the present invention is to provide a process and apparatus of the type described wherein the backwash effluent is passed through a backwash filter adapted to remove particulate matter and solid materials which have been dislodged from an industrial filter during a backwashing operation.

A more specific object of the present invention lies in the provision of a process and apparatus for assisting a backwashing operation through the intermediary of a backwash solution which has its pH value and chlorination level periodically adjusted to facilitate the efficient removal of particulate material from an industrial filter which is being cleaned in a backwashing operation and maintain sanitary conditions, particularly as employed in a beverage bottling plant.

BRIEF DESCRIPTION OF THE DRAWING

The foregoing and other objects and advantages of the novel process and apparatus for treating aqueous backwash effluent pursuant to the teachings of the present invention may be more readily understood by one skilled in the art having reference to the following detailed description of a preferred embodiment thereof, taken in conjunction with the accompanying single FIGURE of the drawing of a flow diagram illustrating an apparatus constructed according to the invention.

DETAILED DESCRIPTION OF THE DRAWING

Referring now in detail to the drawing, there is illustrated a preferred embodiment of a backwash solution recycling system, and which also exemplifies the process of the present invention. A carbonated beverage bottling plant incorporates a precipitator 10 which functions as a settling tank so as to allow various particulate materials entrained in the liquid to settle out and precipitate to the bottom of the tank.

Normally, during a beverage bottling procedure which is carried out in the plant, liquid from the precipitator 10 is pumped, by means of a pump 12, through pump inlet and outlet pipes or conduits 14 and 16 to a sand filter 18 and, additionally, to a carbon filter 22 which are interconnected by pipes 20. The filtered fluid is then passed through a pipe 24 to a polisher 26, to complete the filtering of the fluid. During the filtering operation, control valves 28, 30 and 32 located in the sand filter 18 are opened to thereby allow the liquid to be pumped downwardly through the filter, as shown in the FIGURE, whereas control valves 34 and 36 remain closed. At this time, in the carbon filter 22 the control valves 38, 40 and 42 are maintained in an opened condition during the filtering operation, while valves 46 and 48 are maintained in a closed condition.

The sand and carbon filters 18 and 22 must be periodically cleaned in order to maintain them in efficient operating condition, this being normally accomplished through the intermediary of a backwashing operation in which a backwashing liquid or solution is passed through the filters in a countercurrent flow to that in which fluid normally flows through the filter during a filtering operation. The backwashing of fluid through the filters causes solids accumulated or agglomerated therein to be loosened and dislodged, so as to result in the discharge and entrainment of particulate matter and solids into the backwash effluent.

In a typical prior art procedure of this nature, the effluent from the backwashing operation is dumped into the general effluent discharge of the plant, which produces a number of deleterious effects. Additionally, the backwash liquid frequently is quite expensive inasmuch as it is normally a water-based solution which is treated to maintain its alkalination and chlorination levels within predetermined parameters. Furthermore, the discharge of the backwash effluent produces an overload acting on the waste treatment system of the plant because of the surge or sudden large quantity of backwash solution dumped therein, and also because the solution is chlorinated, and has appreciable quantities of solids matter and particulate material entrained therein.

In accordance with the teachings of the present invention, the backwash effluent is directed through a conduit 50 to a backwash filter 52 adapted to filter and remove from the effluent the particulate material and solids which has initially been removed from the industrial filters 18 and 22. The cleaned backwash solution is then directed to a holding tank 54 in which the solution is stored until a subsequent backwashing operation takes place. In the disclosed process and system, the same quantity of water which is employed during the backwashing operation effected on the sand filter 18 is reused during the backwashing operation on the carbon filter 22, and is then stored in the holding tank 54 in preparation for its reuse in subsequent cleaning of either those filters, or possible additional filters in accordance with the particulate needs for and arrangement of filters in the plant.

The industrial sand and carbon filters 18 and 22 are each sequentially backwashed one at a time. During a backwashing operation of filter 18, valves 30, 32, 34 and 36 have their operative conditions reversed as compared to those in a normal filtering operation, this resulting in the flow of fluid through the filter being reversed and in the backwash effluent being discharged into conduit 50 to thereby direct the effluent to the backwash filter 52. The control valves in sand filter 18 are then returned to their normal filtering positions, and the conditions of the control valves 38, 40, 42 and 48 in carbon filter 22 are then reversed so as to cause the flow of fluid through carbon filter 22 to be reversed. The backwash effluent therefrom is discharged into conduit 50 which directs it to the backwash filter 52. After completion of the backwashing operations on both filters, the various control valves are returned to positions which allow for normal filtering through the industrial filters 18, 22.

In the backwashing operation of a filter, the flow of liquids therethrough is 4 to 6 times greater than the rated flow rate for that filter, depending upon the medium, so as to dislodge and carry away in an entrained state a substantial amount of the solids and particulate material accumulated in the filter. Thus, for instance, if the sand and carbon filters have rated flow rates of 100 gallons per minute, and are normally operated in the beverage bottling plant at that flow rate, during the backwashing operation the flow therethrough will be 400–600 gallons per minute so as to maximize the cleaning effect of the backwashing operation. A backwashing operation typically is carried on for a time period of from five to ten minutes. Following the backwashing operation, the filter is rewashed for a period of time, generally approximately five minutes, to settle back to its normal operating condition, i.e. put back into normal filtering position.

The backwash filter 52 may be a commercially available diatomaceous earth type filter which has diatomaceous earth fed thereinto through a suitable venturi arrangement (not shown) in a manner whereby the amount of diatomaceous earth material supplied to the filter is in a predetermined proportion to the flow of backwash effluent therethrough. One commercially available filter may have metal frames with filter sheets mounted thereon, and with the diatomaceous earth forming a coating on the filter sheets. During cleaning, the sheets are replaced and diatomaceous earth is precoated onto the new filters. During the filtering operation, a gelatin-like layer of solids builds up as a coating on the filters, and the sheets along with the accumulated solids are disposed of in a manner normal to solid waste disposal procedures.

The pH value of the chlorinated backwash solution is maintained within the range of 4.0 to 5.0 in order to maximize its sanitizing efficiency and in cleaning the sand filter 18 during the backwashing operation effected thereon. After a filtering operation, the sand filter typically is coated with a type of lime deposit, and the lower pH value of the backwash solution assists in the removal of the lime particles. The backwash solution is also chlorinated since chlorine enhances the sanitizing action of the carbon filter in the low pH range at which the solution is maintained. A unit 58 for adjusting the pH value of the backwash solution may be one of several commercially available units which operate in an automatic manner. Alternatively, a manual type of unit 58 may be employed, in which pH measurements of the backwash solution are periodically taken and, when necessary, commercially available chemicals may be added to the solution in order to adjust its pH value. A chemical feed unit 60 is adapted to maintain the chlorination level of the backwash solution within a desired range, and may also be an automatic type of unit or, alternatively, the adjustment may be effectuated in a manual operation.

Although only one arrangement for recycling backwash solution has been described in detail herein, particularly with reference to a carbonated beverage bottling plant, it is readily apparent that other systems and processes of a similar nature fall within the purview of the present invention, and that many alternative embodiments suggest themselves to those skilled in the art.

What is claimed is:

1. A process for the treatment and recycling of an aqueous backwash effluent resulting from a backwashing operation, in which an industrial filter is cleaned by passing a water-based solution through the filter in countercurrent flow to that passing through the filter during normal filtering operation so that material entrapped by the filter during the normal filtering operation is dislodged therefrom and entrained in a backwash effluent, comprising the steps of:
    (a) passing said backwash effluent through a backwash filter to remove the material initially removed from said industrial filter during the backwashing operation;
    (b) preparing the water-based solution which has passed through said backwash filter for use in a subsequent backwashing operation; and
    (c) utilizing in subsequent backwashing operations the water-based solution which has passed through said backwash filter.

2. A process as claimed in claim 1, wherein said step of passing the backwash effluent through a backwash filter comprises passing said backwash effluent through a diatomaceous earth filter; and including periodically cleaning said diatomaceous earth filter.

3. A process as claimed in claim 1, comprising adjusting the pH value of said water-based solution.

4. A process as claimed in claim 3, comprising adjusting said pH value to a range of within about 4.0 to 5.0.

5. A process as claimed in claim 1, said industrial filter being a component of an industrial process in a carbonated beverage bottling plant.

6. A process as claimed in claim 1, said preparation for reuse comprising:
    (a) cleaning a second industrial filter in a backwashing operation in which the water-based solution is passed through the second industrial filter in a countercurrent flow to the flow through the second filter in a normal filtering operation, effecting the cleaning of the second industrial filter subsequent to the backwashing of said first-mentioned industrial filter; and (b) passing the backwash effluent from the backwashing operation of the second industrial filter through said backwash filter to remove the material dislodged from said second industrial filter during the backwashing operation.

7. A process as claimed in claim 6, said first-mentioned industrial filter comprising a sand filter and said second industrial filter comprising a carbon filter.

8. A process as claimed in claim 1, comprising chlorinating said water-based solution to enhance the sanitizing effect in the industrial filter.

9. A process as claimed in claim 1, comprising conveying the water-based solution after passing through said backwash filter to a holding tank for storage in preparation for its reuse in a subsequent backwashing operation.

10. Apparatus for treating and recycling an aqueous backwash effluent resulting from backwashing operations on an industrial filter, comprising:

(a) a holding tank for storing a water-based solution adapted for use in periodic backwashing operations;

(b) a backwash filter for removing material from the water-based effluent flowing from the industrial filter during each backwashing operation;

(c) first conduit means for conducting the water-based solution from said holding tank to the industrial filter for effecting each backwashing operation of said industrial filter;

(d) second conduit means for conducting the water-based effluent flowing from the industrial filter during each backwashing operation to said backwash filter; and (e) third conduit means for conducting the water-based solution flowing from said backwash filter during each backwashing operation to said holding tank.

11. Apparatus as claimed in claim 10, said backwash filter comprising a diatomaceous earth filter.

12. Apparatus as claimed in claim 10, comprising means for adjusting the pH value of the water-based solution used in the backwashing operation.

13. Apparatus as claimed in claim 12, said pH adjusting means maintaining the pH value within the range of about 4.0 to 5.0.

14. Apparatus as claimed in claim 10, comprising means for chlorinating the water-based solution to enhance the efficiency of said solution in sanitizing the industrial filter during a backwashing operation.

15. Apparatus as claimed in claim 10, comprising:

(a) a second industrial filter subjected to a cleaning operation.

(b) fourth conduit means for conducting the water-based solution from said holding tank to the second industrial filter for the backwashing operation of said second industrial filter;

(c) fifth conduit means for conducting the water-based effluent flowing from said second industrial filter during a backwashing operation to said backwash filter; and (d) valve means enabling said water-based solution to be selectively conducted through the first industrial filter during a first backwashing operation and conducted through said second industrial filter during a second backwashing operation.

* * * * *